United States Patent Office 2,997,205
Patented Aug. 22, 1961

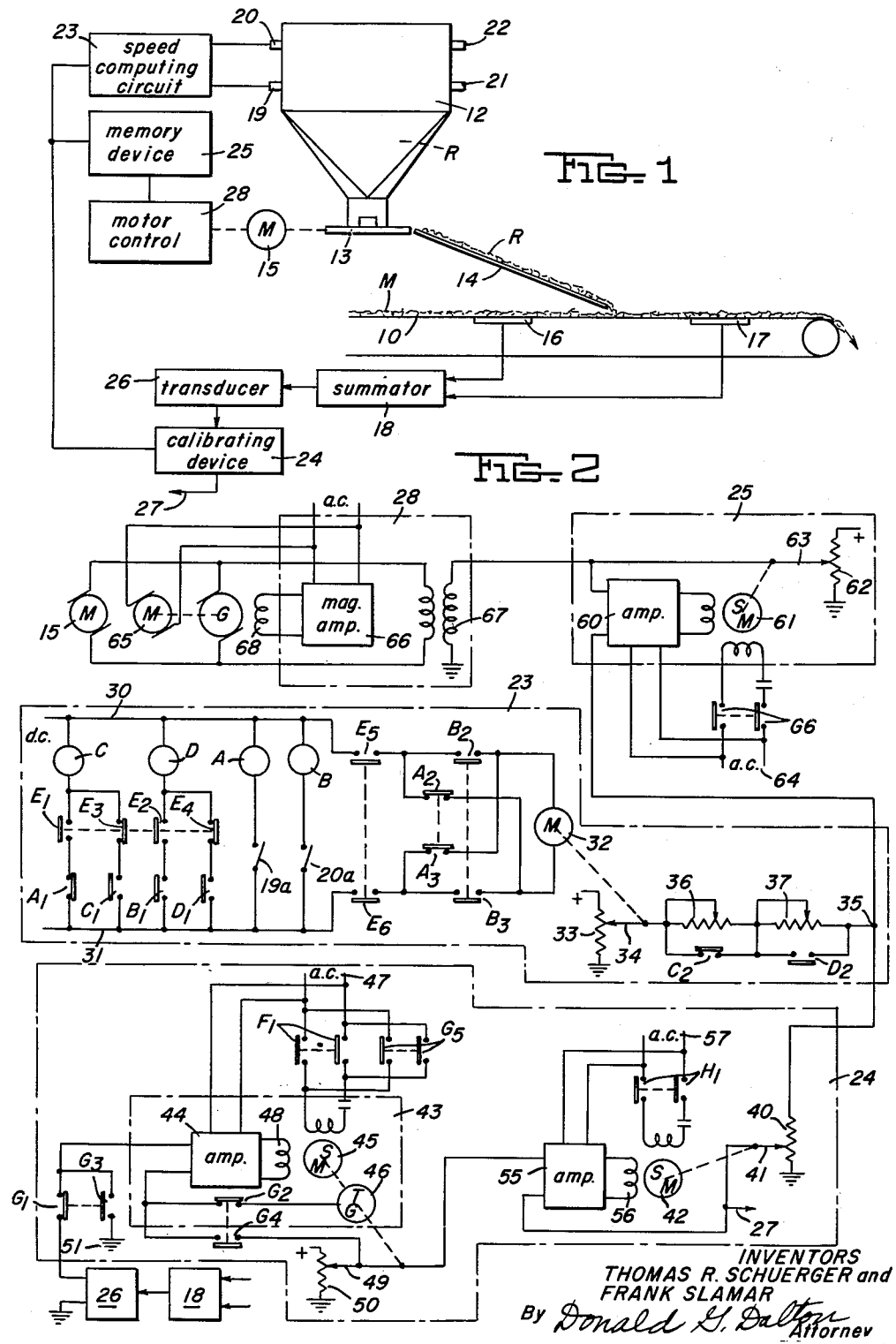

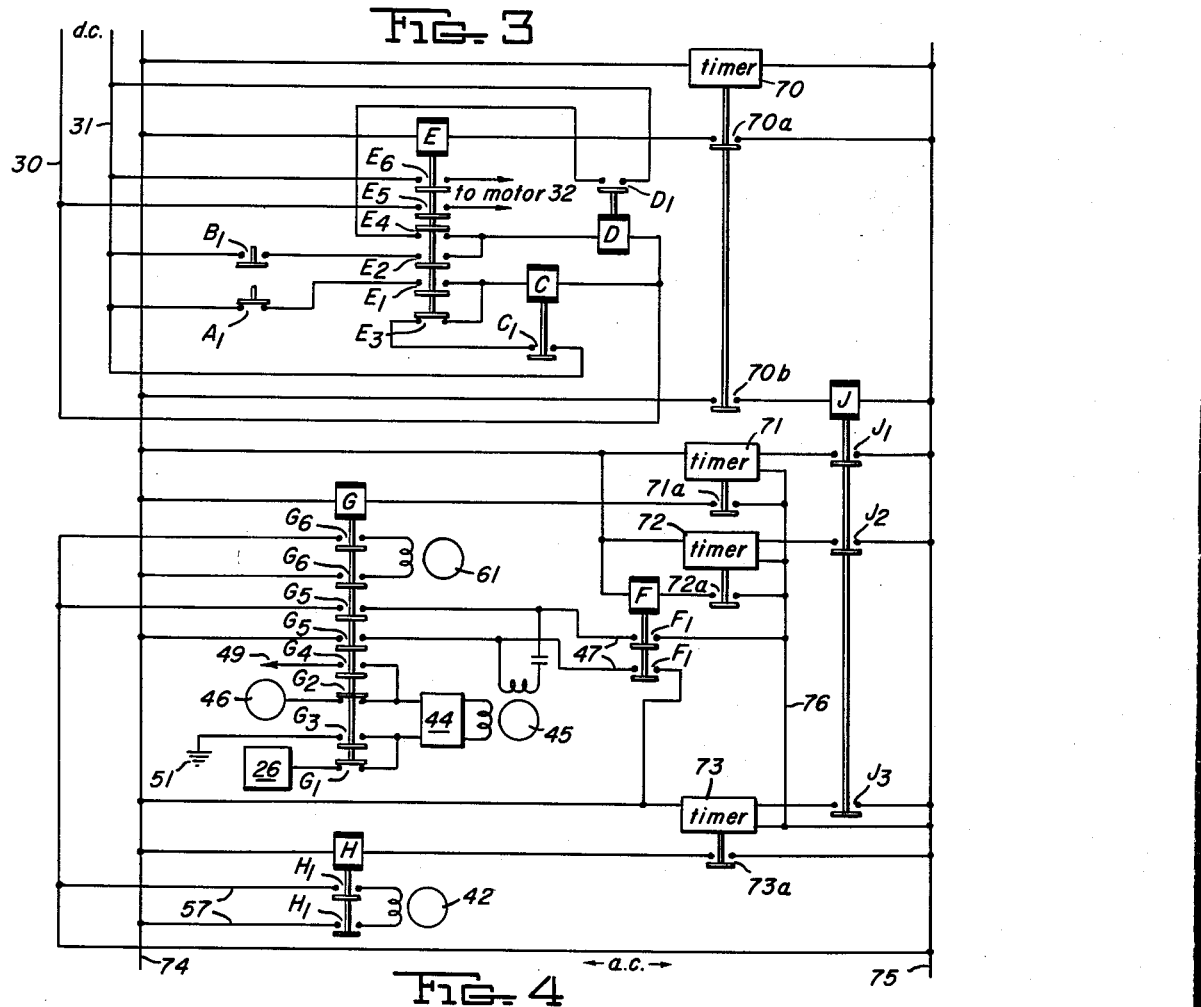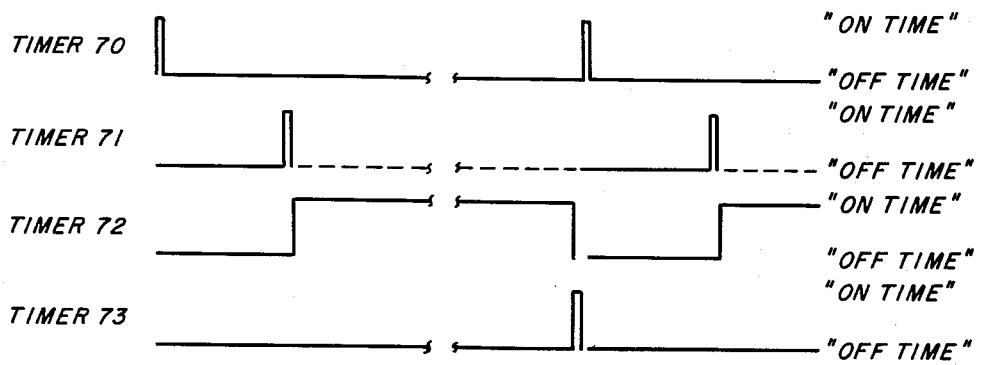
INVENTORS
THOMAS R. SCHUERGER and
FRANK SLAMAR
By Donald G. Dalton
Attorney

2,997,205
METHOD AND APPARATUS FOR CONTROLLING DISCHARGE OF MATERIALS
Thomas R. Schuerger and Frank Slamar, Monroeville, Pa., assignors to United States Steel Corporation, a corporation of New Jersey
Filed June 4, 1958, Ser. No. 739,870
18 Claims. (Cl. 222—1)

This invention relates to an improved mechanism and method for controlling discharge of material from a bin or the like.

An earlier application of the present co-inventor Schuerger Serial No. 579,326, filed April 19, 1956, now abandoned, discloses an apparatus and method for automatic proportioning of ingredients of a sinter feed applicable especially to iron ore. (A continuation-in-part of the earlier application issued as Patent No. 2,980,291, April 18, 1961). The apparatus includes a main conveyor belt, a series of bins located above the belt and containing the individual ingredients, and table feeders for feeding these ingredients in controlled quantities to the belt. Several bins nearest the feed end of the belt contain ore fines and equivalents. The next bins contain additives, such as coke and anthracite fines, flue dust and sized returns. The bin nearest the discharge end of the belt contains hot fines returned from the sintering machine for recycling. These fines, known as "hot recycle," are another equivalent of ore and must be used approximately as received, except that the bin allows sufficient surge capacity to permit their feeding to the belt at uniform rates for reasonable periods. The invention claimed in the earlier application concerns a control for automatically proportioning additives in accordance with combined weight of ore and hot recycle, even though hot recycle reaches the belt after the additives. The mechanism and method of the present invention are particularly suited for controlling the discharge of hot recycle from its bin to the main conveyor in a system like that shown in the earlier application. Nevertheless the invention is not thus limited, but may be applied elsewhere to overcome analogous problems.

An object of the present invention is to provide an improved mechanism and method for controlling discharge of material from a bin or the like to hold the level of material in the bin within a predetermined range.

A further object is to provide an improved mechanism and method for controlling discharge of material from a bin by sensing whether the level of material in the bin is within a predetermined range and, if out of this range, periodically changing the discharge rate by increments first to return the level to the range and thereafter to hold it within the range.

A more specific object is to provide an improved mechanism and method which afford the foregoing type of control by changing the discharge rate by both a temporary increment to return the level to the predetermined range and a permanent increment to hold it in this range.

A further object is to provide the foregoing type of control, but to delay changes until compensating changes are made elsewhere, for example in an apparatus for compounding sinter feed, to delay changes in hot recycle discharge rate until the ore feed rate has been changed inversely.

A further object is to provide the foregoing type of control, and to include means for periodically and automatically calibrating the mechanism.

In accomplishing these and other objects of the invention, we have provided improved details of structure, a preferred form of which is shown in the accompanying drawings, in which:

FIGURE 1 is a diagrammatic side elevational view of a portion of a sinter feed compounding apparatus equipped with a control mechanism in accordance with our invention;

FIGURE 2 is a schematic wiring diagram of a speed computing circuit, calibration device, memory device and motor control embodied in our control mechanism;

FIGURE 3 is a schematic wiring diagram of a timer circuit embodied in our mechanism; and FIGURE 4 is a graph showing the operating sequence.

FIGURE 1 shows a portion of a sinter feed compounding apparatus similar to that of the aforesaid earlier application. The portion shown includes the discharge end of a main conveyor belt 10 carrying a bed of material M, a bin 12 supported above the belt and containing hot recycle R, a table feeder 13 at the bin discharge, and a vibratory conveyor 14 carrying hot recycle from the table feeder to the belt. A variable speed D.-C. motor 15 drives the table feeder, and the quantity of hot recycle discharged from the bin is a function of the speed of this motor. The material M consists of ore (for example iron ore) and additives previously fed to the belt, and protects the belt from direct contact with hot recycle, which commonly is at a temperature sufficient to burn the belt. The belt runs over a first belt scale 16 immediately before hot recycle feeds thereto and a second belt scale 17 immediately after. The difference in weight registered by these scales represents the actual weight of hot recycle reaching the belt. The scales transmit signals to a summator 18, which continuously computes this difference. The scales and summator can be similar to corresponding parts in the earlier application; hence they are shown only in block diagram in the present application. Material discharging from the belt is moistened, mixed in a pug mill, and sintered as in the earlier application.

Bin 12 is equipped with a device for sensing the level of hot recycle therein. The preferred sensing device includes lower and upper radiation-sensitive "Ohmart" cells 19 and 20 mounted on an outside wall of the bin and corresponding radiation sources 21 and 22 mounted on the opposite outside wall. The lower cell 19 and radiation source 21 define the lower limit of the predetermined range within which the hot recycle level is maintained, and the upper cell 20 and radiation source 22 the upper limit. When radiation from either radiation source passes through material in the bin before reaching the corresponding cell, the quantity of radiation reaching the cell is at a minimum. As known in the art, each cell may be compensated by a second cell connected in opposition (not shown) so that the cell transmits no signal when receiving minimum radiation. This device has the advantage that it eliminates any need for mechanical contacts or probes within the bin where they are easily damaged; otherwise a mechanical device would be largely equivalent. When the hot recycle level is within the predetermined range, only cell 20 transmits a signal. When the level is too low, both cells transmit signals; when too high, neither transmits a signal. The cells and radiation sources are not shown in detail, since suitable devices are known and available commercially. Nevertheless reference may be made to Ohmart Patent No. 2,763,790 for a detailed showing of one such arrangement.

The cells 19 and 20 of the sensing device transmit signals to a periodically acting speed computing circuit 23. If the level is outside the predetermined range when the circuit acts, the discharge rate from the bin should be changed, and circuit 23 computes a new speed for motor 15 to effect such change. This new speed equals the algebraic sum of the instant speed, a temporary increment to bring the level back to the predetermined range, and a permanent increment to hold it in this range. Both increments are of course negative when the level is too low and positive when too high. If the level returns from outside the range to within the range, when the circuit again acts, it computes another new speed which equals the instant speed with the temporary increment discontinued. Circuit 23 transmits a signal representative of the most recently computed speed for motor 15 to a calibration device 24 and to a memory device 25. If the speed computed for the next period is the same as for the present speed, this signal merely remains constant. The circuit 23, calibration device 24 and memory device 25 are shown only in block diagram in FIGURE 1, but are shown more completely in FIGURE 2 and described in more detail hereinafter.

The calibration device 24 also receives a signal from the summator 18 representative of the actual weight of hot recycle feeding to belt 10. Even though the motor speed may remain constant, the weight may vary slightly due to such factors as changes in characteristics of the hot recycle or wear of the parts. Since the summator commonly is a pneumatic pressure device and the calibration device is electric, a transducer 26 can be interposed between the two to convert the pressure signal to a proportionate electric signal. The calibration device transmits a signal representative of the weight of hot recycle to be fed at the most recently computed motor speed through a line 27 to a suitable device, not shown, for computing the combined weights of ore and hot recycle feeding to the belt. Consequently a compensating change can be made in the ore feed rate either if a change in the speed of motor 15 is to be made or if there is a change in the weight of hot recycle feeding at the present speed. The transducer 26 is not shown in detail, since devices suitable for this purpose are known and available commercially. Nevertheless reference can be made to Carlson Patent No. 2,059,549 for a detailed showing of one such device. The device which receives the signal from line 27 and the parts associated therewith can be similar to corresponding parts shown in the earlier application; hence their showing is not repeated. If needed, an electric-to-pneumatic transducer can be used to convert the electric signal from the calibration device to a pressure signal for use in these parts. For a showing of a device suitable for this last purpose reference can be made to a publication by the Foxboro Company, Foxboro, Massachusetts, Bulletin 20–16 entitled "EMF Pneumatic Transmitter."

When circuit 23 computes a new speed for motor 15 different from the instant speed, the memory device 25 retains the instant speed until compensating changes are made in the ore feed rate and until belt 10 travels a sufficient distance that the altered portion of bed M reaches the discharge end of vibratory conveyor 14. At the proper moment the signal from circuit 23 representative of the newly computed speed acts on the memory device. Thereupon the memory device transmits this signal to a motor control 28, which changes the speed of motor 15 to the newly computed speed. This speed (including any temporary increments) is held until the cycle repeats. The motor control is shown only in block diagram in FIGURE 1, but is shown more completely in FIGURE 2 and described in more detail hereinafter.

*Speed computing circuit*

FIGURE 2 shows our speed computing circuit 23 more completely, but omits the applicable portion of the timer circuit shown separately in FIGURE 3. Circuit 23 is energized through lines 30 and 31 connected to a suitable D.-C. source. Cell 19 or its mechanical equivalent controls contacts 19a which are connected across these lines in series with the coil of a relay A. Cell 20 or its mechanical equivalent controls contacts 20a which are connected across the lines in series with the coil of a relay B. In each instance the contacts open when the corresponding cell transmits a signal, and close when material in bin 12 cuts off the signal. Thus when the level of material is too low, both contacts 19a and 20a open and both relays A and B are deenergized. When the level is within the predetermined range, contacts 19a close and relay A picks up. When the level is too high, both contacts 19a and 20a close and both relays pick up.

Relays A and B control a pair of relays C and D, which in turn control the application of negative and positive temporary speed change increments respectively. The coil of relay C is connected across lines 30 and 31 in series with back contacts $A_1$ of relay A and front contacts $E_1$ of a relay E of the timer circuit. Similarly the coil of relay D is connected across these lines in series with front contacts $B_1$ of relay B and front contacts $E_2$ of relay E. As hereinafter explained, relay E automatically and periodically picks up for brief intervals. If the level in the bin is within the predetermined range when relay E picks up, neither relay C nor D picks up, since both contacts $A_1$ and $B_1$ remain open. If the level is too low, relay C picks up with relay E, since relay A is deenergized and its contacts $A_1$ closed. Similarly if the level is too high, relay D picks up with relay E since relay B is energized and its contacts $B_1$ closed. Whenever either relay C or D picks up, it seals in via back contacts $E_3$ or $E_4$ of relay E and its own front contacts $C_1$ or $D_1$. Relays C and D are relatively slow-acting to enable them to remain energized during the interval contacts $E_1$ and $E_2$ are opening and contacts $E_3$ and $E_4$ closing. After a temporary increment in the discharge rate returns the level to the predetermined range, contacts $A_1$ or $B_1$ immediately open. The next time relay E picks up and opens its contacts $E_3$ or $E_4$, relay C or D drops out and the temporary increment is discontinued.

Relays A and B also control a reversing motor 32 which in turn controls the application of permanent speed change increments. This motor is connected across lines 30 and 31 in series with back contacts $A_2$ and $A_3$ of relay A and front contacts $E_5$ and $E_6$ of relay E for energizing it in one direction, and in series with front contacts $B_2$ and $B_3$ of relay B and the same contacts $E_5$ and $E_6$ for energizing it in the opposite direction. If the level is within the predetermined range when relay E picks up, the motor does not operate, since contacts $A_2$, $A_3$, $B_2$ and $B_3$ are all open. If the level is too low, the motor runs in a direction to apply a negative increment, since relay A is deenergized and contacts $A_2$ and $A_3$ are closed. Similarly if the level is too high, the motor runs in the opposite direction to apply a positive increment, since relay B is energized and contacts $B_2$ and $B_3$ are closed. In either event the motor stops when relay E drops out and opens its contacts $E_5$ and $E_6$, thus limiting the magnitude of the permanent increment.

The circuit includes a potentiometer 33 whose slide wire is connected to a suitable D.-C. source for developing a speed controlling voltage. The potentiometer has an arm 34 which is electrically connected to an output terminal 35 via two variable resistances 36 and 37 in series, and is mechanically connected to motor 32. Back contacts $C_2$ of relay C are connected in parallel with a portion of resistance 36 and thus normally shunt out this portion of the resistance. When relay C picks up as a result of a low level of material in the bin, contacts $C_2$ open and place the entire resistance 36 in series with arm 34 and terminal 35. Consequently the voltage transmitted to the terminal drops to effect a negative temporary speed increment. Front contacts $D_2$ are connected in parallel with a portion of resistance 37. When relay D picks up as a result of a high level of material in the bin, contacts $D_2$ close and shunt out a portion of the resistance in series with arm 34 and terminal 35. Consequently the voltage transmitted to the terminal rises to effect a positive temporary speed increment. The magnitude of temporary increments can be adjusted by adjusting resistances 36 and 37. When motor 32 runs, it moves arm 34 along the slide wire in a direction to lower or raise the voltage transmitted to the terminal to effect a negative or a positive permanent speed increment. The magnitude of permanent increments can be adjusted by adjusting the length of time the motor runs. The ultimate voltage on the output terminal 35 is proportionate to the most recently computed speed for motor 15 and is transmitted to both the calibration device 24 and memory device 25. This voltage remains constant from the moment it is set until the next time relay E picks up, and even then remains constant unless a speed change is needed.

*Calibration device*

FIGURE 2 also shows the calibration device 24 more completely, but again omits the applicable portion of the timer circuit shown separately in FIGURE 3. The calibration device includes a potentiometer 40 whose slide wire is electrically connected to terminal 35 of the speed computing circuit, whereby the voltage applied to the slide wire is proportionate to the most recently computed speed of motor 15. The potentiometer has an arm 41, which is mechanically connected to a calibrating servomotor 42 and electrically connected with line 27. As hereinafter explained, the servomotor sets the arm 41 in accordance with a proportionality factor representative of the weight of hot recycle which has been feeding. When the voltage transmitted from the output terminal 35 changes, line 27 immediately transmits a voltage proportionate to the weight of hot recycle to be fed at the new motor speed, assuming any immediate change in the rate of feeding is directly proportional to the change in motor speed, that is, a constant proportionality factor.

The calibration device includes an integrator 43, which computes an average rate of feeding for a portion of the period after the memory device 25 and motor control 28 have operated but before the next operation of the speed computing circuit 23, and thus eliminates any effect of minor fluctuations in the rate of feeding at any given motor speed. The integrator comprises an electronic conversion amplifier 44, a servomotor 45, and a tachometer-generator 46. The amplifier has the characteristic that it energizes the servomotor in the appropriate direction whenever its input terminals are at different voltages, but stops the servomotor when they are at the same voltage. The amplifier per se is a known device and hence has been shown only in block form, but reference can be made to Wills Patent No. 2,423,540 for a complete showing of a suitable amplifier of this type. A suitable amplifier is available commercially from Minneapolis-Honeywell Regulator Company under the trade name "Electronik," No. 356,358 and is described in a printed publication by the manufacturer entitled "Service Manual 15019M for Class 15 'Electronik' Instruments" issue 8 (1956). The servomotor is a two-phase A.-C. induction motor which has the characteristic that under transient conditions its speed varies with the voltage applied to its field. We have not described the motor in detail since it likewise is a known device, but for a complete description reference can be made to Thaler and Brown "Servomechanisms Analysis," copyright 1953 by McGraw-Hill Book Company, Inc., pages 63 and 391.

The amplifier 44 and servomotor 45 are electrically connected to a suitable A.-C. source 47 which contains front contacts $F_1$ of a relay F of the timer circuit in series with the servomotor. One input terminal of the amplifier is electrically connected to the transducer 26, whereby the voltage applied to this terminal is proportionate to the weight of hot recycle feeding to belt 10, but subject to minor fluctuations. The other input terminal of the amplifier is electrically connected to one of the output terminals of the tachometer-generator 46, whereby the voltage applied to the latter terminal is proportionate to the generator output. The voltages applied to the two input terminals are of like polarity, but the latter is smaller. The output terminals of the amplifier are electrically connected to a field winding 48 of the servomotor. Periodically relay F picks up for a definite interval and then drops out. The amplifier 44 and servomotor are energized for this interval and deenergized at its conclusion.

The action of the integrator can be explained mathematically as follows:

Let $e_1$ represent the input voltage to the amplifier proportionate to the weight of hot recycle;

$e_2$ represent the input voltage to the amplifier derived from the tachometer-generator;

$t$ represent the time interval the servomotor runs for each calibration;

$x$ represent the number of revolutions of the tachometer-generator during the time $t$.

Then $(e_2-e_1)$ is the effective voltage which tends to drive the servomotor; and $\dfrac{dx}{dt}$ is the angular velocity of the tachometer-generator.

$$e_2 = K\frac{dx}{dt}$$

$$(e_2 - e_1) = K_1\frac{dx}{dt}$$

$$K\frac{dx}{dt} - e_1 = K_1\frac{dx}{dt}$$

$$e_1 = (K - K_1)\frac{dx}{dt}$$

$$x = \frac{1}{K-K_1}\int e_1 dt + \text{constant}$$

Thus it is seen that $x$ is a function of $e_1$, and measurement of $x$ over a definite time interval can be used to obtain an average value of $e_1$ or the average rate at which hot recycle feeds for the same interval.

The tachometer-generator is mechanically connected to the arm 49 of a potentiometer 50 through suitable reduction gearing. At the beginning of a calibration cycle the arm is at a zero or grounded position. The distance the arm travels from this position during time interval $t$ furnishes a measure of the number of revolutions $x$ during this interval. The slide wire of potentiometer 50 is electrically connected to a suitable D.-C. voltage source, whereby arm 49 transmits a voltage proportionate to the average rate at which hot recycle has fed during the interval $t$.

After the computed rate has been utilized to set the potentiometer arm 41, as hereinafter explained, the potentiometer arm 49 is reset to its zero position. For this purpose the connection between transducer 26 and the first input terminal of amplifier 44 contains contacts $G_1$, and the connection between the generator 46 and the other input terminal contains contacts $G_2$, which contacts are in a relay G of the timer circuit and are closed while the integrator is averaging the feed rate. Contacts $G_3$ of relay G are adapted to connect the first input terminal to a ground 51. Contacts $G_4$ of relay G are adapted to connect the other input terminal to arm 49 of the potentiometer 50. Additional contacts $G_5$ of relay G are adapted to connect servomotor 45 to the A.-C. source 47, bypassing the contacts $F_1$. Contacts $G_3$, $G_4$ and $G_5$ are open while the integrator is averaging the feed rate. When the potentiometer arm is to be reset, relay G picks up, whereupon contacts $G_1$ and $G_2$ open and contacts $G_3$, $G_4$ and $G_5$ close. The servomotor 45 runs rapidly in the reverse direction until the voltages applied to the two input terminals of the amplifier 44 are equal. Since one terminal is grounded at 51, these voltages become equal when the other terminal is grounded, that is, when the potentiometer arm 49 reaches its zero setting. The integrator in effect becomes a null-seeking device while it is resetting the arm.

Another electronic conversion amplifier 55 controls the servomotor 42 which periodically sets the potentiometer arm 41 in accordance with the proportionality factor. This amplifier can be of similar construction to that used in the integrator. One input terminal of amplifier 55 is electrically connected to the potentiometer arm 49, whereby the voltage applied to this terminal is proportionate to the average rate of feeding just computed by the integrator. The other input terminal is electrically connected to the slide wire 41. The output terminals of the amplifier are connected to a field winding 56 of servomotor 42. The amplifier and servomotor are electrically connected to a suitable A.-C. source 57, which contains front contacts $H_1$ of a relay H of the timer circuit in series with the servomotor. After arm 49 has been set, relay H picks up and energizes the amplifier and servomotor, which runs until arm 41 reaches a position along its slide wire such that the voltages applied to the two terminals of the amplifier become equal.

The usual condition is that the servomotor moves arm 41 only slightly if at all for each calibration. Any voltage change on the slide wire of potentiometer 40 already has produced a change both in the speed of motor 15 and in the rate at which hot recycle is feeding before the integrator performs its computation, as explained hereinafter in the description of the timer circuit. Consequently the distance which arm 49 travels along its slide wire reflects this change in the feeding rate. A change in the voltage applied to the second terminal of amplifier 55 by reason of a change in voltage applied to potentiometer 40 is largely compensated by arm 49 having reached a different position on its slide wire and thus applying a different voltage to the first terminal.

Memory device

FIGURE 2 also shows the memory device 25, again omitting the applicable portion of the timer circuit. The memory device includes an electronic conversion amplifier 60, a servomotor 61, and a potentiometer 62. The amplifier and servomotor are similar to corresponding parts of the integrator. One input terminal of the amplifier is electrically connected to the output terminal 35 of the speed computing circuit 23, whereby the voltage applied to this terminal is proportionate to the most recently computed speed for motor 15. The other input terminal of the amplifier is electrically connected to the arm 63 of potentiometer 62. The slide wire of this potentiometer is connected to a suitable D.-C. source, whereby voltage applied to the terminal of the amplifier is proportionate to the position of arm 63 along the slide wire. The amplifier and servomotor are electrically connected to a suitable A.-C. source 64, which contains front contacts $G_6$ of relay G of the timer circuit in series with the servomotor. As already mentioned, relay G also controls resetting of the integrator 43 of the calibration device 24. The servomotor 61 is mechanically connected to the potentiometer arm 63.

As already explained, changes in the hot recycle discharge rate are delayed until compensating changes are made in the ore feed rate. After relay E drops out and after an appropriate delay for this purpose, relay G picks up and energizes the amplifier 60 and servomotor 61, as well as resetting the integrator. If the voltage transmitted from terminal 35 to the amplifier has changed since the preceding operation, the servomotor runs and adjusts the potentiometer arm 63 until the voltage transmitted from potentiometer 62 to the amplifier again equals the first voltage. Thereupon the servomotor stops and relay G drops out until time for the next adjustment.

Motor control

The motor control 28 illustrated includes a motor-generator 65 and a magnetic amplifier 66 which has a control winding 67. The magnetic amplifier and motor portion of the motor-generator are connected to suitable A.-C. sources. Arm 63 of potentiometer 62 is electrically connected to the winding 67 and continuously transmits thereto a voltage proportionate to the most recently applied speed for motor 15. The magnetic amplifier is connected to a field winding 68 of the D.-C. generator, whereby the voltage applied to the field winding, and hence the voltage output of the generator, vary with the voltage applied to the control winding 67. The generator is electrically connected to the D.-C. motor 15, whose speed thus is governed by this same voltage. We have not described the magnetic amplifier in detail since it is a known device, but for a complete description reference can be made to Storm "Magnetic Amplifiers," copyright 1955 by General Electric Company. An explanation of the way a magnetic amplifier can be used as a voltage regulator for a D.-C. generator appears on pages 418 and 419 of this publication.

Timer circuit

FIGURE 3 is a schematic wiring diagram of a preferred timer circuit. In addition to the relays C, D, E, F, G and H already mentioned, this circuit includes another relay J and four interval timers 70, 71, 72, and 73. These timers are of a type which have an adjustable "off-time" and an adjustable "on-time" that repeat as long as the timer is running. Such timers per se are known and are available commercially; hence no detailed description is deemed necessary. However reference can be made to a printed publication of General Electric Company entitled "TSA–18 Industrial Interval Timer" for a complete showing and description. Relays C and D are energized from D.-C. lines 30 and 31 already mentioned. The other relays and the timers are energized from lines 74 and 75 connected to a suitable A.-C. source.

Timer 70 runs continuously and has contacts 70a and 70b which open during its "off-time" and close during its "on-time." The "on-time" defines the interval during which the speed computing circuit 23 computes a new speed if such is needed. The "off-time" defines the interval between successive computations while the other actions take place. Contacts 70a and the coil of relay E are connected in series across lines 74 and 75, and likewise contacts 70b and the coil of relay J, whereby relays E and J pick up during the "on-time" and drop out during the "off-time." The way in which relay E controls relays C and D and motor 32 already has been explained in the description of the speed computing circuit 23. Relay J has three front contacts $J_1$, $J_2$ and $J_3$ connected in series respectively with timers 71, 72 and 73 across lines 74 and 75. These three timers do not run continuously like timer 70, but are set to operate through only a single cycle of "off-time" and "on-time" whenever they are energized. Otherwise any errors in timer synchronization would be cumulative and would soon upset the operating sequence. When relay J picks up, timers 71, 72 and 73 are energized and go into "off-time." These timers have a second connection with line 75 via a conductor 76, whereby they continue to operate through the remainder of their cycles after relay J drops out.

After timer 70 shifts from "on-time" to "off-time," there is a delay during which all the timers are in "off-time" to allow any compensating changes in the ore feed rate to be made and to allow conveyor 10 to travel a sufficient distance that such changes are reflected in the bed of material M. Immediately following this delay, the "on-time" of timer 71 commences. This timer has contacts 71a which open when the timer is not running and during its "off-time" and close during its "on-time." Contacts 71a are connected in series with the coil of relay G across lines 74 and 75, whereby relay G picks up during the "on-time" of timer 71 but otherwise drops out.

The way in which relay G controls operation of the servomotor 61 to apply newly computed speeds to motor 15 already has been explained in the description of the memory device. The way in which this relay controls resetting of the integrator 43 already has been explained in the description of the calibration device. Timer 71 remains in "on-time" long enough for these steps to be completed and then ceases to run for the remainder of the cycle.

Next the "on-time" of timer 72 commences. This timer has contacts 72a which open when the timer is not running and during its "off-time" and close during its "on-time." Contacts 72a are connected in series with the coil of relay F across lines 74 and 75, whereby relay F picks up during the "on-time" of timer 72 but otherwise drops out. The way in which relay F controls the integrating action of the integrator 43 already has been explained in the description of the calibration device. The "on-time" of timer 72 defines the interval $t$ mentioned in this description. It should be pointed out that timer 72 allows the integrator to act during a period of the operating cycle while no changes are taking place either in the ore feed rate or the hot recycle feed rate, and also that the integrator acts for most of the period between successive operations of the speed computing circuit in order to furnish a truly representative proportionality factor. After integration is completed, timer 72 ceases to run.

Next the "on-time" of timer 73 commences. This timer has contacts 73a which open when the timer is not running and during its "off-time" and close during its "on-time." Contacts 73a are connected in series with the coil of relay H across lines 74 and 75, whereby relay H picks up during the "on-time" of timer 73, but otherwise drops out. The way in which relay H controls the servomotor 42 to set the calibration device 24 already has been explained in the description of the calibration device. Timer 73 remains in "on-time" long enough for this step to be completed and then ceases to run for the remaining moments of the cycle. Shortly thereafter the "on-time" of timer 70 commences and the cycle repeats.

*Operating sequence*

FIGURE 4 shows a typical sequence diagram for our mechanism when applied to a sinter feed compounding apparatus. Initially timer 70, which runs continuously, is just going into "on-time," and the other timers 71, 72 and 73 are starting to run and going into "off-time." Next timer 70 completes its "on-time" and goes into "off-time" which continues for the remainder of the cycle. For the moment all four timers remain in "off-time" to produce the aforementioned delay. Next timer 71 goes into "on-time," at the conclusion of which this timer ceases to run. Next, and for the greatest part of the cycle, timer 72 goes into "on-time," at the conclusion of which this timer ceases to run. Finally timer 73 goes into "on-time," at the conclusion of which this timer ceases to run. Thereafter the cycle repeats with timer 70 going again into "on-time."

Typically a full cycle requires about 30 minutes. Timer 70 has about 5 to 10 seconds "on-time" at the beginning of the cycle and is in "off-time" for the rest of the cycle. The "on-time" can be adjusted to adjust the length of time motor 32 runs and hence the magnitude of permanent speed increments. The ensuing delay at the conclusion of the "on-time" of timer 70 lasts about 1 to 5 minutes. Timer 71 has about 1 to 5 minutes "off-time" and about 5 to 10 seconds "on-time" and is idle for the rest of the cycle. Timer 72 has a few seconds longer "off-time" than timer 71 and about 20 to 25 minutes "on-time." Timer 73 has slightly less than 30 minutes "off-time" and about 5 to 10 seconds "on-time." However, these intervals are stated only to show a typical example, and may vary widely with different conditions.

From the foregoing description it is seen that the present invention affords a fully automatic control for maintaining the level of material in a bin within a predetermined range. As applied to a compounding apparatus for sinter feed, the invention coordinates any changes in the discharge of hot recycle with compensating changes which must take place. The control also provides for its own automatic calibration. Most of the instruments used are of standard manufacture and readily available commerically.

While we have shown and described only a single embodiment of the invention, it is apparent that modifications may arise. Therefore, we do not wish to be limited to the disclosure set forth but only by the scope of the appended claims.

1. The combination, with a bin adapted to contain material to a level within a predetermined range, and a device for discharging material therefrom at a variable rate, of a control mechanism comprising means for sensing whether the level of material in said bin is within or outside the range, and means operatively connected with said sensing means and said discharging device and operable when the level is outside the range for periodically changing the discharge rate both by a temporary increment to return the level to the range and simultaneously by a permanent increment to hold the level in the range after it has returned.

2. The combination, with a bin adapted to contain material to a level within a predetermined range, and a variable speed device for discharging material therefrom, of a control mechanism comprising means for sensing whether the level is within or outside the range, and a speed computing circuit operatively connected with said sensing means and said discharging device and operable when the level is outside the range to compute new speeds for the discharging device, the new speed including a temporary increment to return the level to the range and a permanent increment adapted to be applied simultaneously with the temporary increment to hold the level within the range after it has returned.

3. The combination, with a bin adapted to contain material to a level within a predetermined range, and a variable speed device for discharging material therefrom, of a control mechanism comprising means for sensing whether the level is within or outside the range, a periodically acting speed computing circuit operatively connected with said sensing means and operable when the level is outside the range to compute a new speed for said discharging device, the new speed equalling the algebraic sum of the instant speed, a temporary increment to return the level to the range and a permanent increment to hold the level within the range after it has returned, said circuit also being operable when the level returns from outside the range to within the range to compute another new speed for said discharging device equalling the instant speed with the temporary increment discontinued, and means operatively connecting said circuit and said discharging device for applying newly computed speeds to said discharging device.

4. The combination, with a bin adapted to contain material to a level within a predetermined range, a variable speed device for discharging material therefrom, and means for receiving material from said discharging device, of a control mechanism comprising means for sensing whether the level is within or outside the range, a periodically acting speed computing circuit operatively connected with said sensing means and operable when the level is outside the range to compute a new speed for said discharging device, the new speed equalling the algebraic sum of the instant speed, a temporary increment to return the level to the range and a permanent increment to hold the level within the range after it has returned, said circuit also being operable when the level returns from outside the range to within the range to compute another new speed for said discharging device equalling the instant speed with the temporary increment discontinued, and time delay means operatively connected with said circuit and said discharging device for applying newly computed speeds to the latter after compensating changes are made with respect to said receiving means.

5. In an apparatus for compounding a mixture of ingredients, which apparatus includes a main conveyor adapted to carry at least one ingredient, a bin adapted to contain another ingredient to a level within a predetermined range, and a variable speed device for discharging said last named ingredient from said bin to said conveyor, the combination therewith of a control mechanism comprising means for sensing whether the level of the ingredient in said bin is within or outside the range, periodically acting computing means operatively connected with said sensing means for computing new speeds for said discharging device to return the level to the range if sensed to be outside and to hold the level within the range if sensed to be already within, and time delay means operatively connected with said computing means and said discharging device for applying newly computed speeds to the latter after a delay to allow compensating changes in the ingredients already on said belt.

6. In an apparatus for compounding a mixture of ingredients, which apparatus includes a main conveyor adapted to carry at least one ingredient, a bin adapted to contain another ingredient to a level within a predetermined range, and a variable speed device for discharging said last named ingredient from said bin to said conveyor, the combination therewith of a control mechanism comprising means for sensing whether the level of the ingredient in said bin in within or outside the range, a periodically acting speed computing circuit operatively connected with said sensing means and operable when the level is outside that range to compute a new speed for said discharging device, the new speed including a temporary increment to return the level to the range and a permanent increment to hold the level within the range after it has returned, and time delay means operatively connected with said circuit and said discharging device for simultaneously applying both increments of newly computed speeds to the latter after a delay to allow compensating changes in the ingredients already on said belt.

7. In an apparatus for compounding a mixture of ingredients, which apparatus includes a main conveyor adapted to carry at least one ingredient, a bin adapted to contain another ingredient to a level within a predetermined range, and a variable speed device for discharging said last named ingredient from said bin to said conveyor, the combination therewith of a control mechanism comprising means for sensing whether the level of the ingredient in said bin is within or outside the range, a periodically acting speed computing circuit operatively connected with said sensing means and operable when the level is outside the range to compute a new speed for said discharging device, the new speed equalling the algebraic sum of the instant speed, a temporary increment to return the level to the range and a permanent increment to hold the level within this range after it has returned, said circuit also being operable when the level returns from outside the range to within the range to compute another new speed for said discharging device equalling the instant speed with the temporary increment discontinued, and time delay means operatively connected with said circuit and said discharging device for applying newly computed speeds to the latter after a delay to allow compensating changes in the ingredients already on the belt.

8. In an apparatus for compounding a mixture of ingredients, which apparatus includes a main conveyor adapted to carry at least one ingredient, a bin adapted to contain another ingredient to a level within a predetermined range, a variable speed device for discharging said last named ingredient from said bin to said conveyor, and weighing means for determining the actual weight of said last named ingredient received on said conveyor, the combination therewith of a control mechanism comprising means for sensing whether the level of the ingredient in said bin is within or outside the range, a periodically acting speed computing circuit operatively connected with said sensing means and operable when the level is outside the range to compute new speeds for said discharging device to return the level to the range and hold it in the range after it has returned, a calibration device operatively connected to said weighing means and said circuit for determining a proportionality factor dependent on the weight of said last named ingredient actually discharging at any speed of said discharging device and transmitting a signal representative of the weight to be discharged at the most recently computed speed, and time delay means operatively connected with said circuit and said discharging device for applying newly computed speeds to the latter after a delay to allow compensating changes in the ingredients already on said conveyor responsive to signals from said calibration device.

9. In an apparatus for compounding a mixture of ingredients, which apparatus includes a main conveyor adapted to carry at least one ingredient, a bin adapted to contain another ingredient to a level within a predetermined range, a variable speed device for discharging said last named ingredient from said bin to said conveyor, and weighing means for determining the actual weight of said last named ingredient received on said conveyor, the combination therewith of a control mechanism comprising means for sensing whether the level of the ingredient in said bin is within or outside the range, a periodically acting speed computing circuit operatively connected with said sensing means and operable when the level is outside the range to compute a new speed for said discharging device, the new speed equalling the algebraic sum of the instant speed, a temporary increment to return the level to the range and a permanent increment to hold the level within the range after it has returned, said circuit also being operable when the level returns from outside the range to within the range to compute another new speed for said discharging device equalling the instant speed with the temporary increment discontinued, a calibration device operatively connected to said weighing means and said circuit for determining a proportionality factor dependent on the weight of said last named ingredient actually discharging at any speed of said discharging device and transmitting a signal representative of the weight to be discharged at the most recently computed speed, and time delay means operatively connected with said circuit and said discharging device for applying newly computed speeds to the latter after a delay to allow compensating changes in the ingredients already on said conveyor in response to the signal from said calibration device.

10. In an apparatus for compounding sinter feed, which apparatus includes a main conveyor adapted to carry a bed of ore fines and additives, the additives being proportioned in accordance with the weight of ore fines and their equivalents, a bin adapted to contain hot recycle to a level within a predetermined range, and a variable speed device for discharging hot recycle from said bin to said conveyor upon said bed, the combination therewith of a control mechanism comprising means for sensing whether the level of hot recycle is within or outside the range, periodically acting computing means operatively connected with said sensing means for computing speeds for said discharging device to return the level to the range if sensed to be outside and to hold the level within the range if sensed to be already within, means for transmitting signals representative of the weight of hot recycle to be discharged at the most recently computed speed to enable compensating changes to be made in the weights of ore and additives included in said bed, and time delay means operatively connected with said computing means and said discharging device for applying newly computed speeds to the latter after the compensating changes have been reflected in said bed.

11. In an apparatus for compounding sinter feed, which apparatus includes a main conveyor adapted to carry a bed of ore fines and additives, the additives being proportioned in accordance with the weight of ore fines and their equivalents, a bin adapted to contain hot recycle to a level within a predetermined range, and a variable speed device for discharging hot recycle from said bin to said conveyor upon said bed, the combination therewith of a control mechanism comprising means for sensing whether the level of hot recycle is within or outside the range, a periodically acting speed computing circuit operatively connected with said sensing means and operable when the level is outside the range to compute new speeds for said discharging device, the new speed including a temporary increment to return the level to the range and a permanent increment to hold the level within the range after it has returned, means operatively connected with said computing circuit for transmitting signals representative of the weight of hot recycle to be discharged at the most recently computed speed to enable compensating changes to be made in the weights of ore and additives included in said bed, and time delay means operatively connected with said computing circuit and said discharging device for applying newly computed speeds to the latter after the compensating changes have been reflected in said bed.

12. In an apparatus for compounding sinter feed, which apparatus includes a main conveyor adapted to carry a bed of ore fines and additives, the additives being proportioned in accordance with the weight of ore fines and their equivalents, a bin adapted to contain hot recycle to a level within a predetermined range, and a variable speed device for discharging hot recycle from said bin to said conveyor upon said bed, the combination therewith of a control mechanism comprising means for sensing whether the level of hot recycle is within or outside the range, a periodically acting speed computing circuit connected with said sensing means and operable when the level is outside the range to compute a new speed for said discharging device, the new speed equalling the algebraic sum of the instant speed, a temporary increment to return the level to the range and a permanent increment to hold the level within the range after it has returned, said circuit also being operable when the level returns from outside the range to within the range to compute another new speed for said discharging device equalling the instant speed with the temporary increment discontinued, means operatively connected with said computing circuit for transmitting signals representative of the weight of hot recycle to be discharged at the most recently computed speed to enable compensating changes to be made in the weights of ore and additives included in said bed, and time delay means operatively connected with computing circuit and said discharging device for applying newly computed speeds to the latter after the compensating changes have been reflected in said bed.

13. A combination as defined in claim 12 in which said apparatus also includes weighing means for determining the actual weight of hot recycle discharged to said conveyor and said means for transmitting signals representative of the weight of hot recycle includes a calibration device operatively connected with said weighing means for applying a proportionality factor to the signal.

14. A method of maintaining the level of material in a bin within a predetermined range, while continuously discharging material therefrom, comprising sensing whether the level is within or outside the range, periodically computing new discharge speeds when the level is sensed to be outside, which new speeds include a temporary increment to return the level to the range and a permanent increment to hold the level in the range after it has returned, and simultaneously applying both increments of newly computed speeds to the discharge.

15. A method of maintaining the level of material in a bin within a predetermined range comprising discharging material from the bin at a substantially constant rate for a period, sensing whether the level remains within or moves outside the range, periodically computing new discharge rates when the level is outside the range, the newly computed rates equalling the algebraic sum of the instant rate, a temporary increment to return the level to the range and a permanent increment to hold it in the range after it has returned, and periodically changing the discharge rate to the newly computed rate.

16. A method of maintaining the level of material in a bin within a predetermined range comprising discharging material from the bin at a constant rate for a period, sensing whether the level remains within or moves outside the range, periodically computing new discharge rates when the level moves outside the range, the new rates equalling the algebraic sum of the instant rate, a temporary increment to return the level to the range and a permanent increment to hold it in the range after it has returned, periodically computing other new discharge rates when the level returns from outside the range to within the range, the last named new rates equalling the instant rate with the temporary increment discontinued, and periodically changing the discharge rate to the newly computed rate.

17. In compounding a sinter mix of individual ingredients which include ore, additives and hot recycle, a method of controlling the addition of hot recycle comprising feeding hot recycle from a supply thereof at a constant rate for a period, sensing whether the level of hot recycle in the supply remains within or moves outside a predetermined range, periodically computing new rates for feeding hot recycle when the level moves outside the range to return the level to the range and thereafter hold the level within the range, changing the other ingredients to compensate for changes in hot recycle at newly computed feed rates, and applying newly computed feed rates to hot recycle after delays for compensating changes to be reflected in the mix.

18. In compounding a sinter mix of individual ingredients which include ore, additives and hot recycle, a method of controlling the addition of hot recycle comprising feeding hot recycle from a supply thereof at a constant rate for a period, sensing whether the level of hot recycle in the supply remains within or moves outside a predetermined range, periodically computing new rates for feeding hot recycle when the level moves outside the range, the newly computed rates equalling the algebraic sum of the instant rate, a temporary increment to return the level to the range and a permanent increment to hold it in the range after it has returned, changing the other ingredients to compensate for changes in hot recycle at newly computed feed rates, and applying newly computed feed rates to hot recycle after delays for compensating changes to be reflected in the mix.

References Cited in the file of this patent

UNITED STATES PATENTS

| | | |
|---|---|---|
| 1,922,883 | Crago | Aug. 15, 1933 |
| 1,983,093 | Montgomery | Dec. 4, 1934 |
| 2,040,157 | Story et al. | May 12, 1936 |
| 2,147,422 | Bendz | Feb. 14, 1939 |
| 2,261,655 | Lowe | Nov. 4, 1941 |
| 2,381,505 | Lindholm | Aug. 6, 1945 |
| 2,618,395 | De Brabander | Nov. 18, 1952 |
| 2,658,644 | Lowe | Nov. 10, 1953 |
| 2,737,997 | Hemmelheber | Mar. 13, 1956 |
| 2,797,702 | Martin | July 2, 1957 |

FOREIGN PATENTS

| | | |
|---|---|---|
| 729,633 | Great Britain | May 11, 1955 |